United States Patent [19]

Moeller et al.

[11] Patent Number: 4,707,813

[45] Date of Patent: Nov. 17, 1987

[54] ULTRASOUND APPARATUS PERMITTING DYNAMIC VARIATION OF THE POSITION OF THE RECEPTION FOCUS

[75] Inventors: Reiner Moeller; Gert Hetzel, both of Erlangen; Ulrich Saugeon, Nuremberg; Gustav Boheim, Zirndorf; Viktor Zurinski, Erlangen, all of Fed. Rep. of Germany

[73] Assignee: Siemens Aktiengesellschaft, Berlin and Munich, Fed. Rep. of Germany

[21] Appl. No.: 929,736

[22] Filed: Nov. 12, 1986

[30] Foreign Application Priority Data

Dec. 2, 1985 [DE] Fed. Rep. of Germany ....... 3542562
Jan. 31, 1986 [DE] Fed. Rep. of Germany ....... 3603042

[51] Int. Cl.$^4$ .............................................. G01S 9/68
[52] U.S. Cl. .................................... 367/103; 367/105; 73/626
[58] Field of Search .................. 128/660; 73/609, 613, 73/626, 628, 631; 367/105, 103, 122, 123, 135, 901

[56] References Cited

U.S. PATENT DOCUMENTS

| | | | |
|---|---|---|---|
| 3,435,406 | 3/1969 | McCauley | 73/613 X |
| 3,905,009 | 9/1975 | Hughes et al. | 367/123 |
| 4,159,462 | 6/1979 | Rocha et al. | 73/626 X |
| 4,173,007 | 10/1979 | McKeighen | 367/1 X |
| 4,208,916 | 6/1980 | Thomenius | 73/626 |
| 4,228,686 | 10/1980 | Tancrell | 73/626 |
| 4,234,940 | 11/1980 | Iinuma | 367/105 |
| 4,235,111 | 11/1980 | Hassler | 73/626 |
| 4,253,338 | 3/1981 | Iinuma et al. | 367/105 |
| 4,258,575 | 3/1981 | Buchner | 73/626 |
| 4,305,296 | 12/1983 | Green et al. | 73/626 |
| 4,331,158 | 5/1982 | Partridge | 128/709 |
| 4,351,038 | 9/1982 | Alais | 367/105 |
| 4,392,379 | 7/1983 | Yamaguchi | 73/626 |

FOREIGN PATENT DOCUMENTS

2148005 5/1985 United Kingdom .
2153528 8/1985 United Kingdom .

Primary Examiner—Deborah L. Kyle
Assistant Examiner—Brian S. Steinberger
Attorney, Agent, or Firm—Hill, Van Santen, Steadman & Simpson

[57] ABSTRACT

An ultrasound apparatus permitting dynamic variation of the position of the reception focus of a prescribable number of ultrasound transducer elements has a reception channel including a time-delay circuit for the received ultrasound echo signal following every ultrasound transducer element. For switching between different, prescribed time-delay values ($T_1, T_2, \ldots T_n$), the time-delay circuit is connected to a control device. A part of the time-delay circuit is redundantly designed, so that first and a second sub-circuits for forming the time-delayed ultrasound echo signal are present. A dissolve circuit is provided which causes the second sub-circuit to be faded in the reception channel when the first sub-circuit, in a blanked condition, is switched to a different time-delay value ($T_1, T_2, \ldots T_n$), and vice versa, by a control device. Significant time is thus saved when switching between the different focus positions of the ultrasound apparatus. Transmission of switching clicks onto the respectively activated sub-circuit is prevented by the use of isolating amplifiers.

23 Claims, 10 Drawing Figures

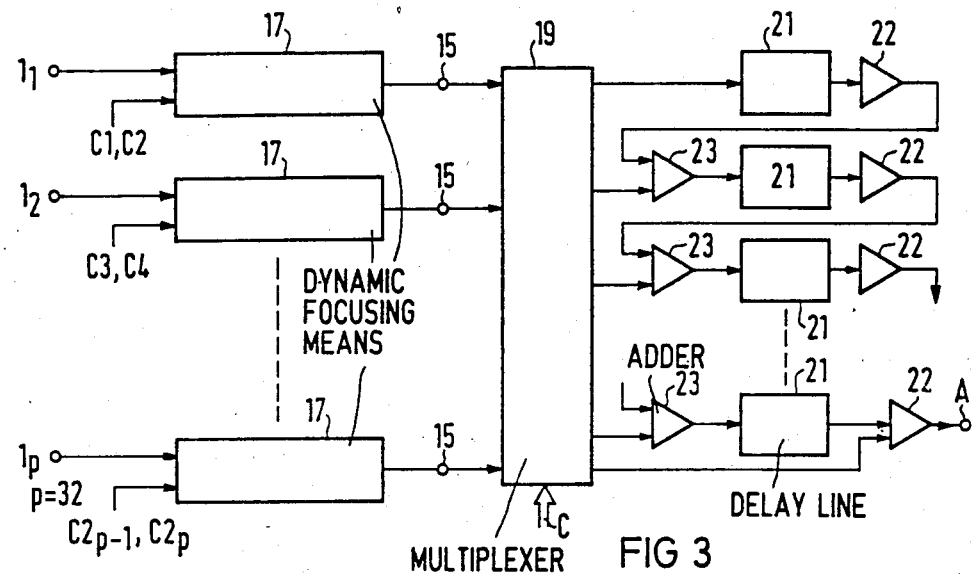
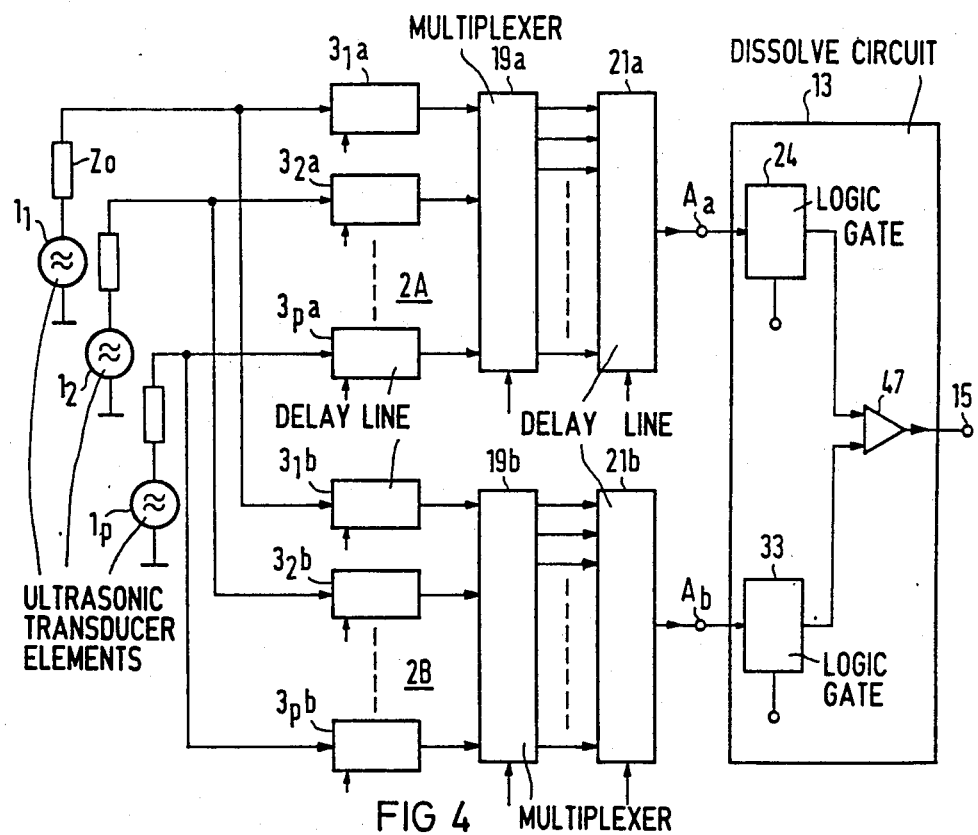

ULTRASOUND APPARATUS PERMITTING DYNAMIC VARIATION OF THE POSITION OF THE RECEPTION FOCUS

BACKGROUND OF THE INVENTION

1. Field of the Invention

The present invention relates to an ultrasound apparatus which permits dynamic variation of the position of the reception focus, and in particular to such an apparatus wherein an ultrasound transducer element has an associated reception channel including a time-delay circuit for the received ultrasound echo signal, the time-delay circuit being connected to a control means for switching among various selected values of time-delay.

2. Description of the Prior Art

It is standard in ultrasound examination technology to acheive a variation of the position of the reception focus of an ultrasound array (ultrasound antenna) by so-called electronic focussing. To that end, the received echo signals for every transducer element or for a group of transducer elements of the ultrasound array are differently time-delayed. A curved reception line is thereby simulated, exhibiting different foci in accord with the degree of curvature. In phased-array apparatus, not only focussing but also a modification of the emission direction are done. This so-called swing is likewise effected via an electronic time-delay.

In dynamic focussing, an ultrasound signal is emitted and the reflected ultrasound echoes are subsequently received given successively set focus positions. In a phased-array apparatus or in multi-channel, large antennas, there is a desire to be able to switch the position of the reception focus rather frequently during the reception of an ultrasound line, i.e. dynamically. Given a large antenna having aperture correction, for example, ten focus positions per ultrasound line should be achieved. In phased-array apparatus, work is usually carried out with the full antenna. Even more than ten focus positions per ultrasound line can be desirable in this context.

When the focus positions are quickly switched during the reception of the ultrasound echo signals by a switch-over means, for example with conventional analog switches, spikes or switching clicks from these switches occur. Particularly when a depthdependent amplification means follows the switch-over means in the reception channel, can occur image disturbances.

A further disadvantage arises when the switching between the focus positions ensues too abruptly. The boundary surfaces between the focus positions can then be seen on the picture screen due to differing presentation of the fine echo structure produced by cut-off errors.

In order to avoid an abrupt switching, a method for dissolving the focused positions "softly", i.e., for example, within 10 µs, is used in ultrasound apparatuses having a linear array. This procedure is meaningful given few focus positions, for example three focus positions, during the reception of the ultrasound line. The dissolve region is then short in comparison to the effective regions of the individual focus positions. Therefore, few higher-frequency components which could falsify the useful signal arise during switching. Moreover, the switch-over outlay can be economically justified given few processing channels. The number of dissolve elements required for the "soft" switching is determined by the number of reception channels multiplied by the number of focus positions. The "effective region" of a focus position is the time during which the array exhibits a constant, electronic curvature.

This procedure, however, is no longer meaningful given phased array apparatuses or given large reception antennas having many focus positions. The effective region of the individual focus position then lies in the proximity of the switch-over time so that, in the extreme case, only switching is carried out and the ultrasound echo signals are no longer received within a constant effective region.

SUMMARY OF THE INVENTION

An object of the present invention is to obtain an effective region for each focus position in an ultrasound apparatus having many focus positions.

In an ultrasound apparatus of the type described above using dynamic focussing, it is therefore an object of the invention to achieve short switch-over times with justifiable outlay without having the frequency spectrum caused by the respective switch-over event lying noticeably in the frequency band of the received ultrasound echo signals, and therefore leading to image disturbances.

This object is achieved in accordance with the principles of the present invention wherein at least a part of the time-delay circuit is redundantly provided, so that first and second sub-circuits are present for the formation of the time-delayed ultrasound echo signal, and wherein a dissolve circuit is provided.

The dissolve circuit functions so that the second sub-circuit is respectively faded into the reception channel when the first sub-circuit, in the blanked condition is switched to a different time-delay value by the control means, and so that the first sub-circuit is respectively faded into the reception channel when the second sub-circuit, in the blanked condition, is switched to a different time-delay value by the control means.

The control means can thus undertake switching to another prescribed time-delay value, i.e. to another focus position, without influencing the reception of the echo signals. Thus, an advantage is that the transmission of switching clicks superimposed on the useful echo signals is avoided. Because the switch-over to a different focus position is respectively undertaken in that sub-circuit which is non-activated or "blanked" at the moment, i.e. not faded into the reception channel, switching clicks produced by the switch-over cannot influence the reception channel. This elimination of the switching clicks could hitherto be achieved only by the trade off of accepting doubled exposure time. The doubled exposure time arose because two identical ultrasound lines were registered with different positions of the switching times for the focus switching, and subsequently only those image data from both ultrasound lines wherein switching clicks had no influence on the echo signal were employed for the compolation of a resulting undisturbed ultrasound line.

By means of a suitable selection of the dissolve circuit, the dissolve time can be shortened such that the actual effective region of the individual focus positions is not lost. Switch-over times between 1 through 5 µs are possible.

Further, the employment of a "soft" switch-over function in the dissolve circuit enables a reduction of cut-off errors in the ultrasound echo signals which proceed into the reception channel given fast switching by the fade-over circuit.

An especially simple, cost-beneficial embodiment having a low space requirement has first and second sub-circuits comprising respective first and second summing delay lines each having a plurality of inputs, every input having a prescribed elay time allocated thereto. Every receive channel from a predetermined plurality of receive channels is selectively connectible to a desired input of the two time-delay lines, so that the ultrasound echo signals of the predetermined receive channels are available at the output of each of the two time-delay lines as an ultrasound sum signal after the time-delay. The ultrasound sum signals of the first and of the second sub-circuit are respectively supplied to the dissolve circuit.

Thus two separate sub-circuits need not be provided for every individual ultrasound reception channel. As shall be set forth below in an exemplary embodiment, four reception channels can, for example, be linked to a summing time-delay line; dissolving can then be carried out spike-free from the ultrasound sum signal of the one sub-circuit to the ultrasound sum signal of the other sub-circuit and vice versa. The outlay (double sub-circuit) per reception channel is thus reduced to the same outlay (double sub-circuit) for what are now, for example, four reception channels. The advantages of the spike-free dissolving from one focus position into the next thereby remain fully preserved.

Given this latter embodiment, it is preferable that the ultrasound sum signal of the first time-delay line be conducted to a first analog-to-digital converter and the ultrasound sum signal of the second time-delay line be conducted to a second analog-to-digital converter. The outputs of the first and of the second analog-to-digital converter are respectively connected to first and second inputs of a digital multiplexer, so that the two analog-to-digital converters and the digital multiplexer form the dissolve circuit.

DESCRIPTION OF THE DRAWINGS

FIG. 3 is a schematic block diagram of the use of dynamic focussing using the circuits of FIG. 1 or FIG. 2 in a phased-array apparatus.

FIG. 4 is a further embodiment of a circuit for a phased-array apparatus.

DESCRIPTION OF THE PREFERRED EMBODIMENTS

Figure 1:
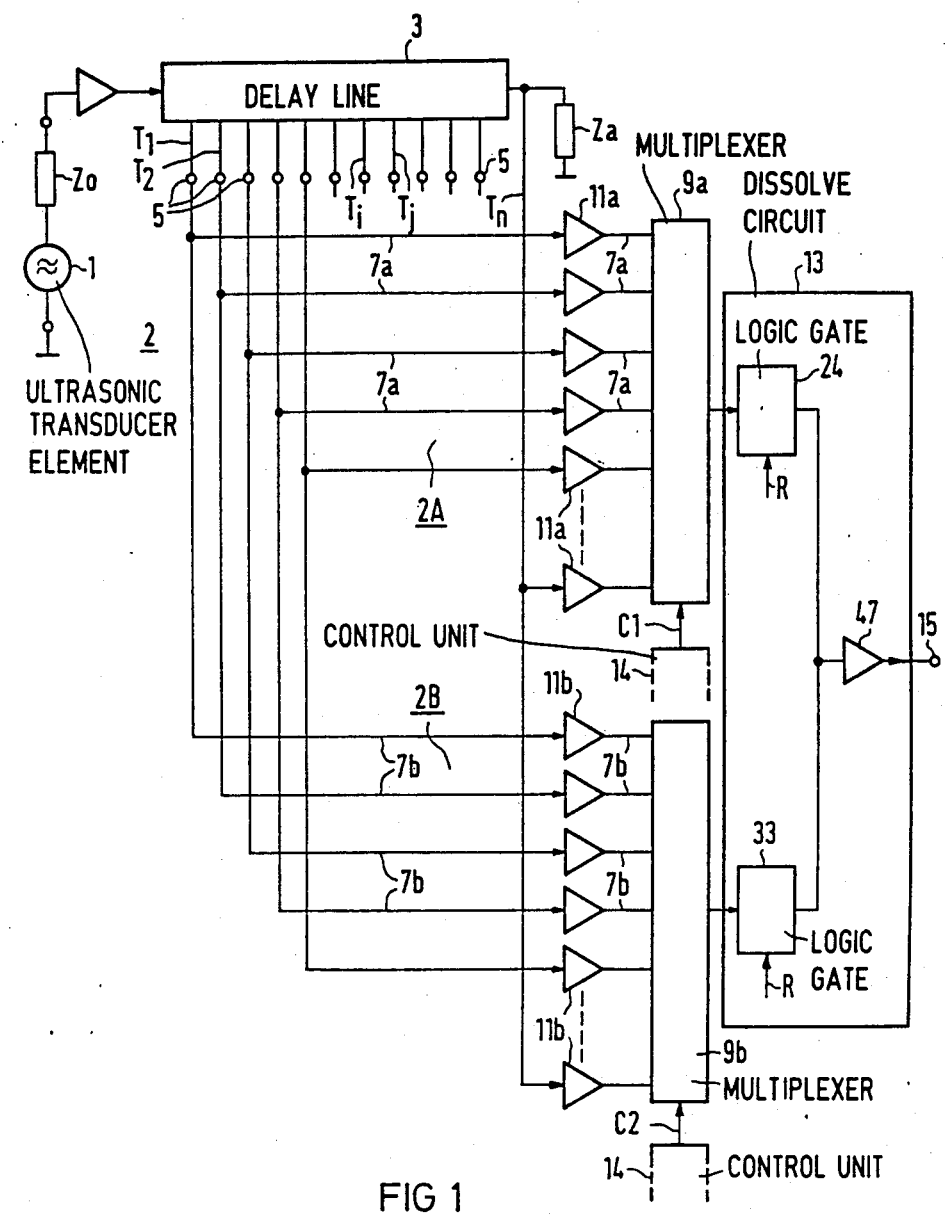
FIG. 1 is a schematic circuit diagram of a first exemplary embodiment of a time-delay circuit constructed in accordance with the principles of the present invention.

FIG. 1 shows a single, grounded ultrasound transducer element 1 of an ultrasound array as signal source for an ultrasound echo signal. The signal source has an internal resistance Zo. Via an isolating amplifier, the ultrasound echo signal is supplied to a time-delay circuit 2 having a time-delay line 3 with a plurality of taps 5. The ultrasound echo signal can be taken at successive taps 5 delayed by a time-delay $T = T_j - T_i$. The time delays are referenced $T_1, T_2, \ldots T_i, T_j \ldots T_n$. The fineness of the time-delay T is defined by the plurality n of taps 5. Given large arrays or antennas, for example, to n=10; a plurality up n=64 can be meaningful in phased-array apparatus. The end of the time-delay line 3 (maximum time delay $T_n$) is connected to RF-ground via a terminal impedance Za. The terminal impedance Za exhibits the same value of resistance as the output resistance of the preceding isolating amplifier.

A first connecting line 7a leads from every tap 5 to one of n inputs of a first multiplexer 9a. A first isolating amplifier 11a is interposed in every connecting line 7a, this isolating amplifier preventing switching clicks from running in the direction of the delay line 3 when switching the multiplexer 9a. This isolating amplifier also receives the signal from the time-delay line as a high-impedance load. At its input side, thus, the first multiplexer 9a has a total of n inputs corresponding to the number n of taps 5. The output side of the multiplexer 9a is applied to the first input of a dissolve circuit 13.

A second connecting line 7b is connected to every tap 5, this second connecting line 7b leading to one of n inputs at the input side of a second multiplexer 9b. A second isolating amplifier 11b is correspondingly arranged in every connecting line 7b, this isolating amplifier 11b preventing switching clicks which arise when switching the second multiplexer 9b from proceeding to the delay line 3. The output side of the second multiplexer 7b is connected to the second input of the dissolve circuit 13. The dissolve circuit 13 has an output 15 at which the time-delayed ultrasound echo signal is available for further processing.

The multiplexers 9a and 9b are connected to a control unit 14 which supplies two control signals C1 and C2, each control signal respectively connecting one input through to the output of the multiplexer 9a or 9b controlled thereby. This procedure is known, for example, from U.S. Pat. No. 4,208,916. It is important that multiplexers 9a and 9b are alternately driven, i.e. activated, to a through-connect state based on prescribed patterns, by the control unit 14.

In this exemplary embodiment, the time-delay line 3, the first connecting lines 7a, the first isolating amplifiers 11a and the first multiplexer 9a form a first sub-circuit 2A which is connected to the dissolve circuit 13. The time-delay line 3, the second connecting lines 7b, the isolating amplifiers 11b and the second multiplexer 9b form a second sub-circuit 2B which similarly has its output side connected to the dissolve circuit 13. The dissolve circuit 13 alternately forwards the output of the first and second multiplexers 9a and 9b to its output 15. This switching preferably ensues "softly", as shall be set forth in greater detail below.

The ultrasound echo signal received by the ultrasound transducer element 1 is present at the individual tabs 5 with n different time-delay values $T_1, T_2, \ldots T_i, T_j, \ldots T_n$. Upon reception of an ultrasound signal, the ultrasound echo signal is forwarded to the dissolve circuit 13 via the first multiplexer 9a. At, for example, the begining of the reception in a first time segment, this dissolve circuit 13 is in a through-connected status with respect to the first multiplexer 9a, so that the ultrasound echo signal proceeds to the output 15 for further processing. During this first time segment in which registration is carried out with a focus position 1, for example in accord with the time-delay $T_1$, the second multiplexer 9b is switched and is already prepared for the next, i.e. the second, focus position II. For example, the second tap having the time-delay $T_2$ in accord with the second focus position II is applied to the second input of the dissolve circuit 13 by the second multiplexer 9b. In accord with a function sequence to be set forth in greater detail below, the dissolve circuit 13 continuously dissolves the input from the first multiplexer 9a with the input from the second multiplexer 9b during the first, third, fifth time segments. When this dissolve function is concluded, the ultrasound echo signal at the output 15 is from the second input of the second multiplexer 9b which was through-connected. In this condition of the time-delay circuit 2, thus, the time-delay of the ultrasound echo signals is $T_2$, obtained via the second sub-circuit 2B.

In the following, second time segment, the first sub-circuit 2A is for processing the third focus position III by switching the first multiplexer 9a to, for example, the delay time $T_3$.

Figure 1A:
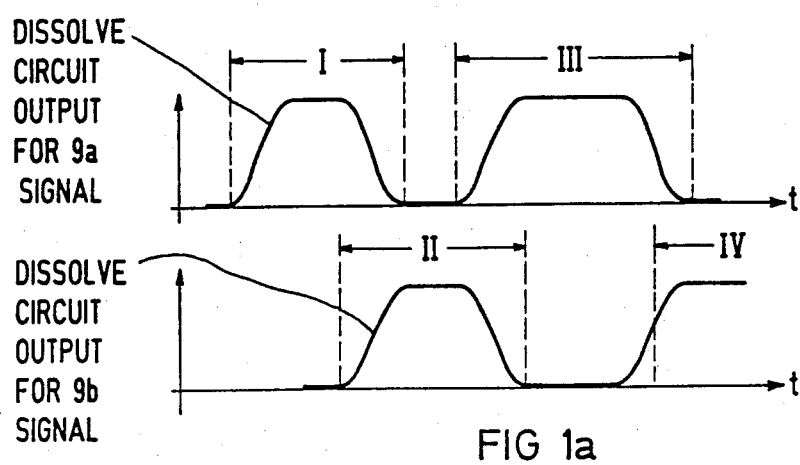
FIG. 1a is a signal/time diagram of two dissolve circuit signals.

When the effective region of the second focus position II with the time-delay $T_2$ has expired, the dissolve circuit 13 is again switched softly to its first input, at which the first multiplexer 9a set the time-delay $T_3$ is present, and the first reception of the ultrasound echo signal is taken over from there. This operation of alternate switching is repeated until all desired focus positions I, II, III, . . . are traversed. This is illustrated in FIG. 1a with reference to the transmission behavior of the dissolve circuit 13 with respect to its first and second input.

The advantage of this procedure is that no time is lost due to the switching of the multiplexers 9a, 9b. The switching is respectively carried out when the sub-circuit 2A or 2B in which the switching is taking place is not activated. This time-saving is of considerable significance when offering many focus positions, for example given ten or more focus positions I, III, . . . X. A further significant advantage is that, due to the arrangement of the isolating amplifiers 11a and 11b in the respective connecting lines 7a and 7b, no switching pulses or clicks proceed in reverse direction to the delay line 3. These switching clicks arise only when the associated multiplexer 9a or 9b is switched in its non-activated condition. It is thus possible to obtain a time-delayed ultrasound echo signal free of switching clicks for every individual ultrasound line and to compile an image from the echo signals of these lines in a conventional way.

Figure 2:
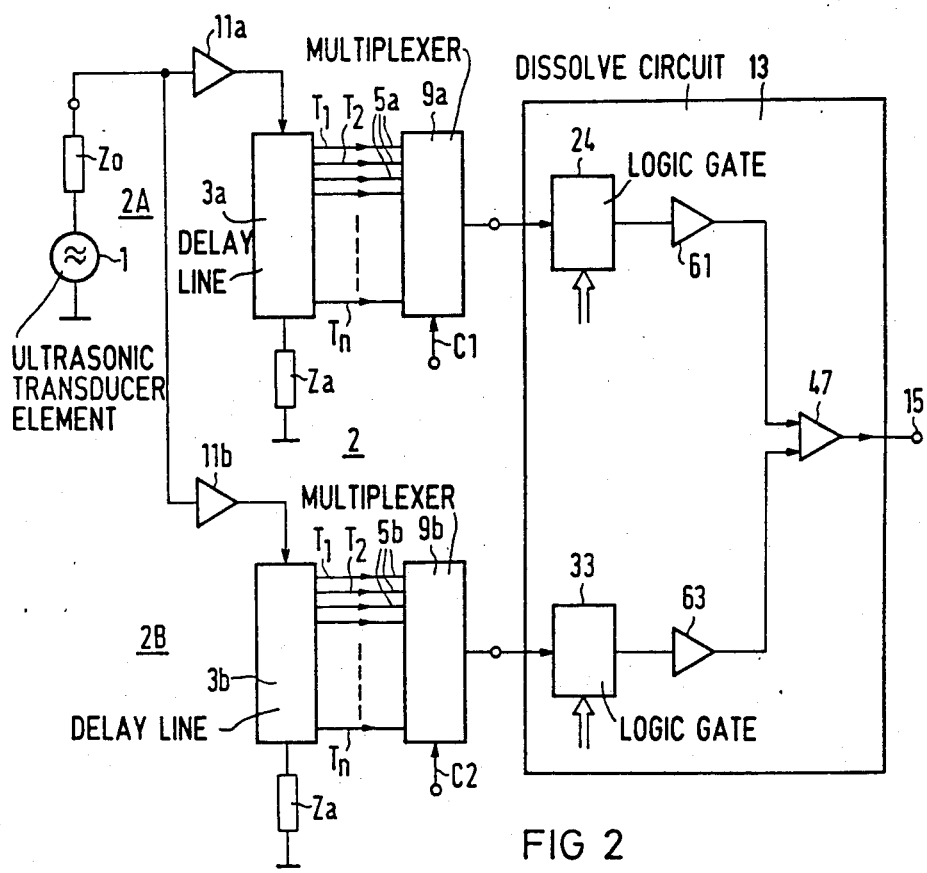
FIG. 2 is a schematic circuit diagram of another embodiment of the apparatus shown in FIG. 1.

FIG. 2 shows a second embodiment of a time-delay circuit 2 with which the same functional advantages can be achieved. Identical component parts are provided with the same reference characters. Via a first impedance transformer or isolating amplifier 11a, an ultrasound transducer element 1 having an internal resistance Za feeds the ultrasound echo signal into a first time-delay line 3a having the terminal impedance A. The time-delay line 3a has a plurality n of taps 5a each having a time-delay value $T_1, T_2, \ldots T_n$ allocated thereto. $T = T_j - T_i$ again applies for arbitrary, neighboring taps. The taps 5a are individually connected to the inputs at the input side of a first multiplexer 11a. In accord with the number n of taps 5a, the multiplexer 11a has n inputs. Based on the value of a control signal C1, the multiplexer 11a switches one of the inputs to its output. This is connected to the first input of a dissolve circuit 13. The first isolating amplifier 11a, the first timedelay line 3a and the first multiplexer 11a form a first sub-circuit 2A for the time-delay of the ultrasound echo signal. A second sub-circuit 2B is constructed analogously thereto, composed of second isolating amplifiers 11b a second delay line 3b and a second multiplexer 11b. The second sub-circut 2B is connected between the second input of the dissolve circuit 13 and the ultrasound transducer element 1. In this embodiment, the functioning of the alternate dissolving from the first to the second sub-circuit 2A or 2B and vice versa is identical to the functioning set forth in FIG. 1. An advantage of this embodiment is that 2n isolating amplifiers are not needed, which would be extremely costly given a high number n. A total of only two isolating amplifiers 11a and 11b are utilized, respectively preceding the time-delay circuits 3a and 3b, in order to prevent switching clicks from proceeding to the respectively activated sub-circuit 2A or 2B. The additional outlay of a second time-delay line 3b is accepted as a compromise.

FIG. 3 shows an example of how the time-delay circuit 2 as shown in FIGS. 1 or 2 can be utilized for setting the curvature in a phased-array apparatus. Identical component parts are again provided with the same reference characters. FIG. 3 shows a plurality p, for example p=32, reception channels of a phased-array apparatus. The ultrasound echo signal proceeds from the ultrasound transducer element 1 of the first reception channel to a dynamic focussing means 17 which is constructed in accord with the combination of time-delay circuit 2 and dissolve circuit 13 of FIGS. 1 or 2 set forth above. In accord with FIG. 1, the dynamic focussing means 17 would be composed of the time-delay line 13, connecting lines 7a and 7b, isolating amplifiers 11a and 11b, multiplexers 9a and 9b and the dissolve circuit 13. In accord with FIG. 2, the dynamic focussing means 17 would be composed of the isolating amplifiers 11a and 11b, time-delay lines 3a and 3b, connecting lines 5a and 5b, multiplexers 9a and 9b and the dissolve circuit 13. The output of the dissolve circuit 13 referenced 15 in FIGS. 1 and 2 is shown in FIG. 3. The time-delay line 3 within the dynamic focussing means 17 has a maximum value of, for example, $T_n = 500$ nsec. An identical reception channel having identically constructed focussing means 17 is provided for each of the p ultrasound elements $1_1, 1_2, \ldots 1_p$ of the ultrasound array. Together, all p=32 means 17 form the respective reception focus of the array.

In every reception channel, the output 15 of the dissolve circuit 13 is applied to the allocated input of a multiplexer 19. The multiplexer 19 thus has p inputs in accord with the number of reception channels. Controlled via a selection signal C, the multiplexer 19 translates the number of inputs p onto a prescribable number m of outputs. This occurs in accord with a prescribed function adapted to the application, known in the field of phased-arrays.

The first of the m outputs of the multiplexer 19 is connected to a first time-delay line 21 which leads to an adder 23 via an isolating amplifier 22. In the adder 23, the time-delayed ultrasound echo signal at the second output of the multiplexer 19 is added to the first time-delayed output signal and, together with the first output signal, is supplied to a second time-delay line 21 which is allocated to the second output. This procedure is repeated until the last time-delay line 21 is traversed at the $(m-1)^{th}$ output of the multiplexer 19. The output thereof is supplied to the $(m-1)^{th}$ isolating amplifier 22 together with the undelayed output signal of the $m^{th}$ output. At the last isolating amplifier 22, this successively traversed series of time-delay lines 21 has an output A at which the ultrasound echo signals are taken for a specific curvature condition of the array (prescribed by the focussing means 17) and for a defined swing angle of the array (prescribed by the time-delay lines 21). The time-delay line 21 thus serves for setting the swing angle for the phased-array. As an of order of magnitude, the sum of the delay times of all time-delay line 21 lies in the range between about 5 and about 20 $\mu s$, for example at 7 $\mu s$.

FIG. 4 shows an exemplary embodiment wherein the time-delay circuit of the overall time-delay is redundantly provided. "Overall time-delay" means both the time-delay which serves for dynamic focussing via the curvature of the array and the time-delay which serves for the electronic definition of the swing direction. In accord with FIG. 4, all components of the time-delay circuit of every ultrasound element $1_1, 1_2, \ldots 1_p$ are redundantly (doubly) constructed. This is illustrated by reference characters "a" and "b". The sub-circuit 2A, for example, includes time-delay lines $3_1a, 3_2a, \ldots 3_pa$ for the fine time-delay, a first multiplexer 19a having an input/output ratio p:m, and a first coarse time-delay line 21a. The overall output Aa of the time-delay circuit 2A is conducted to the first input of the dissolve circuit 13. The sub-circuit 2B is correspondingly constructed. It can be shown with this embodiment that the said advantages can also be achieved given the rough time-delay for achieving the swing in a phased-array.

Figure 5:
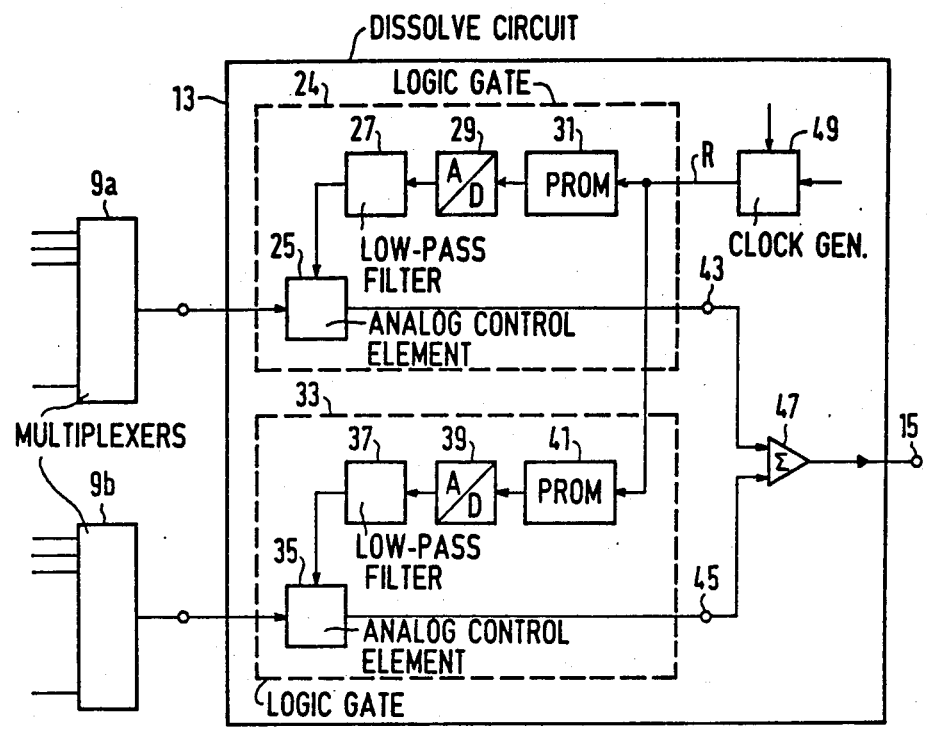
FIG. 5 is a block circuit diagram of a dissolve circuit suitable for use in the above embodiments.

FIG. 5 shows an exemplary embodiment of the dissolve circuit 13. This can be utilized in FIG. 1, 2 or 4 but is only set forth for FIGS. 1 and 2. The output of the multiplexer 9a is applied to the input of a first, continuously controllable gate 24 including a first analog control element 25, for example a transistor-controllable amplifier or multiplier, with a drive circuit including a first low-pass filter 27, a first digital-to-analog converter 29 and a first PROM 31.

The output of the second multiplexer 9b is applied to the input of a second continuously controllable gate 33 which includes a second analog control element 35, for example a transistor, and a drive circuit including a second low-pass filter 37, a second digital-to-analog converter 39 and a second PROM 41. The first and the second gates 24 and 33 have respective gate outputs 43 and 45 connected to the two inputs of a summation element 47. The output of the summation element 47 is identical to the output 15 of the dissolve circuit 13 in FIGS. 1 and 2.

The drive circuits for the gates 24 and 33 are connected to a clock generator 49 through which a start or stop signal can be forwarded from the control means 14 of the ultrasound apparatus to the gates 24 and 33.

Figure 6:
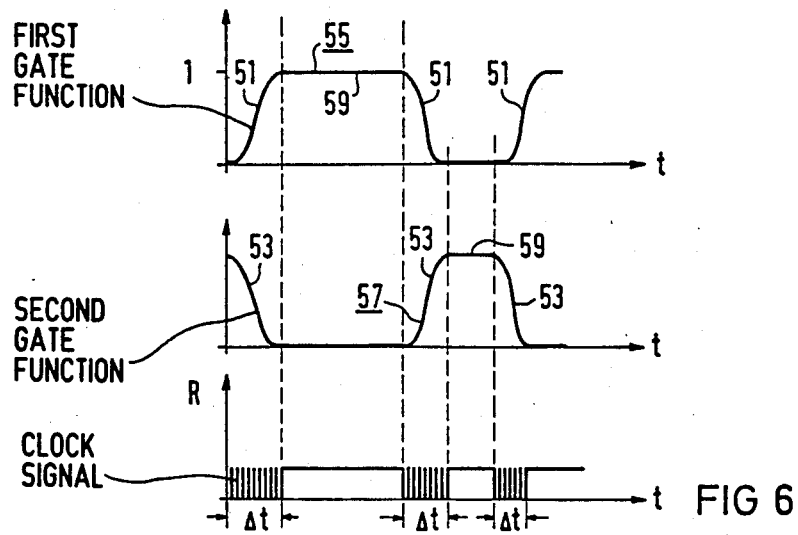
FIG. 6 is a signal/time diagram for various functions and signals in the dissolve circuit of FIG. 5.

First and second dissolve functions 51 and 53, as shown in FIG. 6, are respectively stored in the first and second PROMS 31 and 41. The dissolve functions 51 and 53 are selected such that they are complementary to one another. The term "complementary" means that the two dissolve functions 51 and 53 are combinable to form a prescribable value, for example, unity. If, for example, the first dissolve function 51 is a sine squared curve, the second dissolve function 53 is selected with a cosine squared curve. Other suitable dissolve functions such as, for example, the Hamming function or other window functions may be used. It is important in the selection of the dissolve functions 51 and 53 that one of the functions has a value of zero in accord with the blanked condition of the dissolve circuit 13 when the other function reaches its maximum value for the transmission condition of the gate 24 or 33. Dissolve is thus to be alternately undertaken from the first gate 24 to the second gate 33 and vice versa. The first dissolve function 51 and the second dissolve function 53 respectively exhibit their intended dissolve curve only when switching to a different focus position. When the ultrasound echo signal is received given a constant focus position in the effective region of an allocated focus position I, II, III, ..., the gates 24 and 33 respectively remain either in their transmissive or inhibited state. This condition is clearly shown in FIG. 6.

In accord with FIG. 1, the summation element 47 is preferably an amplifier. Moreover, as shown in FIG. 2, a further isolating amplifier 61 or 63 can be provided respectively between the first and the second gates 24 and 33 and the summation element 47.

FIG. 6 shows three signal curves below one another dependent on time t. The first signal curve is a first gate function 55 as is present at the control input of the first gate 24. The second curve corresponds to a second gate function 57 as is present at the control input of the second gate 33. The third curve indicates time periods $\Delta t$ in which clock signals R are forwarded from the clock generator 49 to the first and second PROMS 31 and 41.

The first gate function 55 is composed of dissolve functions 51 and straight curve sections 59. The latter arise when the clock signal R is no longer supplied to the PROM 31. These straight curve sections 59 are always present when echo signals are received within a prescribed focus position I, II, III, ... which is determined via the connected input of the allocated multiplexer 11a. Dependent on whether the first sub-circuit 2A is then activated, the straight curve section 59 will lie at the value 1 or at the value 0. The lengths of the straight curve sections 59 can be differently selected, since the effective region of the different focus positions can also be of unequal length.

As may be seen from FIG. 6, the second curve, which represents the second gate function 57, is composed of the dissolve function 53 and of curve sections 59 which are again straight. As stated above, it is important that the two gate functions 55 and 57 exhibit opposite transmission behavior during the straight curve sections 59. When the one is at the maximum value, for example 1, the other must assume the value 0, and vice versa. In the dissolve phases with $\Delta t$ in which the gate functions 55 and 57 are determined by the respective dissolve functions 51 and 53 stored in the PROMs 31 and 41, the dissolve functions 51 and 53 exhibit an opposite progression. When the first dissolve function 51 rises softly (for example, in accord with a sine squared function), the second dissolve function 53 decreases in accord with a cosine squared curve. The complement of the two gate functions 51 and 53 is thereby preserved. A soft dissolve from the first gate 24 with preceding, first sub-circuit 2A to the second gate 33 with preceding, second sub-circuit 2B, and vice versa, thus occurs. As already mentioned, the dissolving should ensue as softly as possible in order to obtain a favorable frequency response of the switch-over operation with respect to the frequency band of the time-delayed echo signal. The frequency spectrum of the switch-over pulse arising during the switch-over operation should lie completely outside of the frequency band of the echo signals insofar as possible.

An exemplary embodiment wherein a prescribable number of reception channels, for example, four reception channels, is combined for every sub-circuit shall be set forth below.

Figure 7:
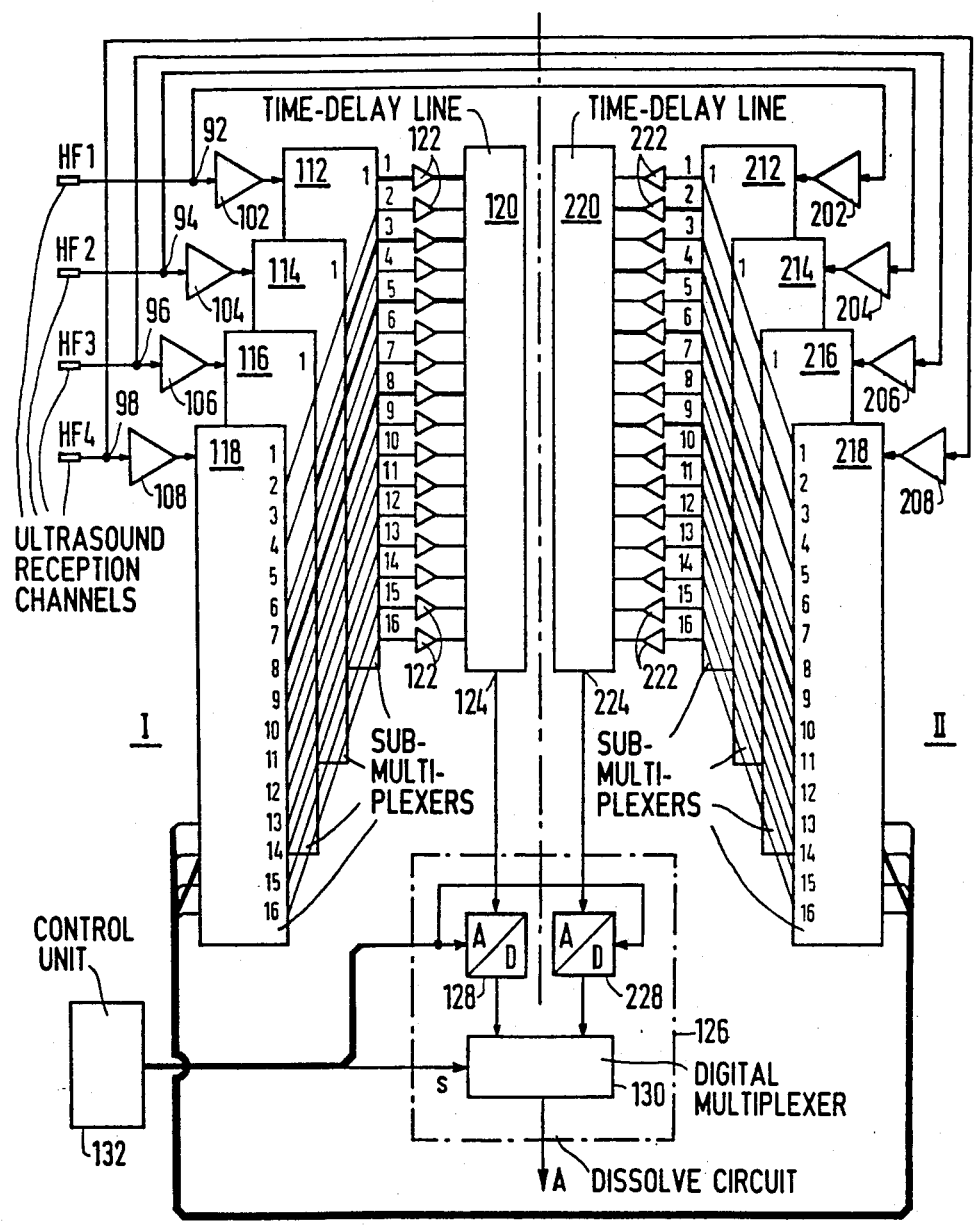
FIG. 7 is a schematic circuit diagram of an ultrasound apparatus constructed in accordance with the principles of the present invention for four ultrasound reception channels having two sub-circuits.

FIG. 7 shows four reception channels HF1 through HF4 of a medical ultrasound apparatus which works with an array of ultrasound transducer elements. At every point in time, the reception channels HF1 through HF4 are allocated to a group of four transducer elements, whereby the signals of these four transducer elements can be summed in a phase-corrected manner. This technique is suitable both for phased-arrays as well as for linear arrays. The phase differences to be corrected are so small within a group of four neighboring transducer elements that, for example, 500 ns suffice for correction. Remaining phase differences from group to group are held constant during a scan line with this method, so that a dynamic change is eliminated.

When, give application of this technique to linear arrays, the plurality of transducer elements is greater than the plurality of the HF channels (such as, for example, 128 or 64), the aperture formed by the HF channels can be moved along the transducer elements by means of step-by-step forwarding in a known way.

After transmission, the transducer elements generate ultrasound echo signals. In order to be able to receive the ultrasound echo signals with the same quality from different depths of the examined subject, i.e. of a patient, the aforementioned so-called dynamic focussing is necessary. In the dynamic focussing, the ultrasound echo signals supplied from different ultrasound transducer elements are respectively electronically delayed with predetermined time-delay values, i.e. are subjected to the so-called electronic focussing depthdependent. The prescribed time-delay values differ for different focus positions or focus depths. A switch-over in the time-delay circuit must thus be undertaken in order to proceed from one focus position in a receive line into the next focused position. Such a switch-over usually generates spikes which are visible on the displayed images as disturbances.

The manner by which such disturbances due to spikes are prevented shall be set forth below with reference to the group of four reception channels HF1 through HF4. For this purpose, every reception channel HF1 through HF4 has nodes 92 through 98 from which a respective connection leads to two identical sub-circuits I and II. Each of the remaining (64−4)=60 reception channels is correspondingly combined in a group of four which is connected to two of its own, identical sub-circuits to which prescribed time-delays are allocated in the course of the focussing. Leading from the nodes 92 through 98 are respective connections to isolating amplifiers 102, 104, 106 and 108 in the first subcircuit I and to isolating amplifiers 202, 204, 206 and 208 in the second sub-circuit II. The outputs of isolating amplifiers 102 through 108 are respectively connected to sub-multiplexers 112, 114, 116 and 118 constituting a four-part analog multiplexer. The outputs of amplifiers 202 through 208 are respectively connected to the inputs of sub-multiplexers 212, 214, 216, 218, also constituting a four-part analog multiplexer. Each sub-multiplexer 112, 114, 116, 118 and 212, 214, 216, 218 is commercially available as, for example, a 1:16 multiplexer. Each four sub-multiplexers are connected parallel at the output side.

The analog multiplexers 112 through 118 as well as 212 through 218 respectively has outputs identical in number to the number of inputs of respective following first and second time-delay summing lines 120 and 220. If the inputs and outputs differ, selection must be undertaken. In the present case, for example, 16 inputs are provided for each line. Respective amplifiers 122 and 222 for matching to the time-delay line is respectively interposed between every output of the multiplexer 112 through 118 and 212 through 218 and the associated input of the allocated time-delay line 120 or 220.

The ultrasound echo signals at the inputs are delayed in the time-delay lines 120 and 220 in accord with the time-delay value of the respective input. The time-delayed echo signals are thus available as ultrasound sum signals at the outptus 124 and 224 of the respective time-delay lines 120 and 220.

The two outputs 124 and 224 are connected to a dissolve circuit 126. The dissolve circuit 126 has an output A at which, dependent on the switch status, either the ultrasound sum signal of the output 124 of the first sub-circuit I or the ultrasound sum signal of the output 224 of the second sub-circuit II is available. The sum signal from A is further processed in a known way and is displayed on a picture screen (not shown).

For each sub-circuit I and II, the dissolve circuit 126 has an analog-to-digital converter 128 or 228 as well as a shared digital multiplexer 130. The sum signal of the first sub-circuit I is conducted from the output 124 of the first time-delay line 120 to the first analog-to-digital converter 128 and is converted therein into a digital sum signal which is supplied to a first input of the digital multiplexer 130. Analogously thereto, the sum signal of the second sub-circuit II is conducted from the output 224 of the second time-delay 220 to the output of second analog-to-digital converter 228. The output thereof is supplied to a second input of the digital multiplexer 130. Dependent on the extant selection signal, the digital multiplexer 130 switches either the first or the second input through to its output A. This switch-over ensues free of spikes so that image disturbances are avoided.

A central control unit 132 is connected to each of the analog multiplexers 112 through 118 and 212 through 218, to the two analog-to-digital converters 128 and 228, and to the digital multiplexer 130. The central control unit 132 supplies each control input of the analog multiplexers 112 through 118 and 212 through 218 with the information concerning to which four of the sixteen outputs its four inputs should be through-connected.

As already mentioned, a respective ultrasound echo signal is at every node 92 through 98, namely the ultrasound echo signal from the reception channel HF1 at the node 92, that from the reception channel HF2 at the node 94, etc. After amplification by the isolating amplifiers 102 and 202, the ultrasound echo signal of the reception channel HF1 is supplied to a respective input of the analog sub-multiplexers 112 or 212. These isolating amplifiers 102 and 202 having high inverse attenuation have the essential job of keeping the spikes from arising when switching the analog multiplexers away from the nodes 92 through 98. This means that a switching of the analog multiplexers in the blanked sub-circuit cannot lead to any image disturbances due to spikes in the faded-in sub-circuit. On the basis of the information from the central control unit 132, for example, the input of the analog sub-multiplexer 112 is applied to the first output 1 thereof. This is indicated in FIG. 1 by heavy line thickness at the first output 1. As mentioned, every multiplexer 112 through 118 and 212 through 218 has, for example, sixteen outputs which are respectively connected to one of the sixteen inputs of the associated time-delay line 120 or 220. The inputs are consecutively numbered from 1 through 16.

Via the allocated sub-multiplexers 114, 116 or 118 of the first sub-circuit I, the reception channels HF2, HF3, and HF4 are analogously respectively supplied, for example, to the third, fifth or eighth output of the sub-multiplexers 112 through 118 and thus, to the corresponding input of the first time-delay line 120. This is again indicated by a heavy line thickness in FIG. 1. The activation of the first, third, fifth and eighth output of the first sub-multiplexer 112 through 118 means reception in a prescribed focus position, for example in a ninth focus position.

In the second sub-circuit II, the reception channels HF1 through HF4 are likewise applied to four inputs of the second time-delay line 220. However, the central control unit 132 has caused a through-connection to another four inputs than those for the first time-delay line 120. As again indicated by heavy line thickness, these inputs in the second time-delay line 220 are, for example, the inputs 2, 4, 6 and 9. Accordingly, the echo signals supplied to the inputs 2, 4, 6 and 9 of the second time-delay line 220 are charged with different time-delay values, corresponding to a different, prescribed focus position given the aforementioned electronic focussing.

The ultrasound echo signals are differently time-delayed in the time-delay line 120 of the first sub-circuit I in accord with their connected input. If, for example, the delay time of the time-delay line 120 amounts to a total of 500 ns and when the sixteen inputs are separated into identical time-delay segments of 500 ns/16=31.25 ns, the ultrasound echo signal of the reception channel HF1 at to the input 1 is time-delayed with about 500 ns, the ultrasound echo signal of the reception channel HF2 at the input 3 is time-delayed with about 438 ns, the ultrasound echo signal of the reception channel HF3 at the fifth input is time-delayed with about 375 ns and the ultrasound echo signal of the reception channel HF4 at the eighth input is time-delayed with about 281 ns. The corresponding values given the illustrated switch status of the second sub-circuit II wherein the time-delay line 220 again has a maximum time delay of, for example, 500 ns are respectively 469 ns, 406 ns, 344 ns and 250 ns.

The summed ultrasound echo signals at the output 124 of the first time-delay line 120 constitute a first ultrasound sum signal. This ultrasound sum signal has arisen based on an $m^{th}$ focus position determined by the control unit 132. The ultrasound sum signal at the output 224 of the second time-delay line 220 has arisen based on a $(m+1)^{th}$ focus position which is preferably adjacent to the first and which immediately follows this in the depth direction.

When, at output A, a dissolve is to be undertaken from the ultrasound sum signal of the sub-circuit I to the ultrasound sum signal of the sub-circuit II, the digital multiplexer 130 is correspondingly switched by the central control unit 132. After the switch-over, thus, it is no longer the first input with connection to the sub-circuit I but the second input with connection to the sub-circuit II which is connected to the output A. As already mentioned, this switching from the focus position m to (m+1) ensues without the disturbing spikes which otherwise lead to image disturbances.

Immediately after this switch-over event, i.e. when the sub-circuit II is still activated, the sub-multiplexers 112 through 118 of the first sub-circuit I are changed or switched-over to a new focus position (m+2). To this end, the central control unit 132 connects the inputs of the sub-multiplexers 112 through 118 to different outputs. For example, the sub-multiplexer 112 then has its third output supplied to the third input of the time-delay line 120, the sub-multiplexer 114 has its fifth output applied to the fifth input of the time-delay line 120, the sub-multiplexer 116 has its seventh output applied to the seventh input of the time-delay line 120 and the sub-multiplexer 118 has its tenth output applied to the tenth input of the time-delay line 120. The focus position (m+2) deriving therefrom is shifted in comparison to the operating status of the sub-circuit which is now still activated.

This operation is repeated in alternation until all desired reception focus positions 1, 2m, (m+1), (m+2) in a reception line have been traversed. A switch-over to the next transmission and reception line is now undertaken to the preceding or following assemblies in the line blanking interval. An ultrasound exposure with dynamic focussing which is essentially free of switching clicks can be achieved in this way with comparatively little outlay. A course aperture disconnection can be realized in a simple way by disconnecting one of the two analog-to-digital converters.

Figure 8:
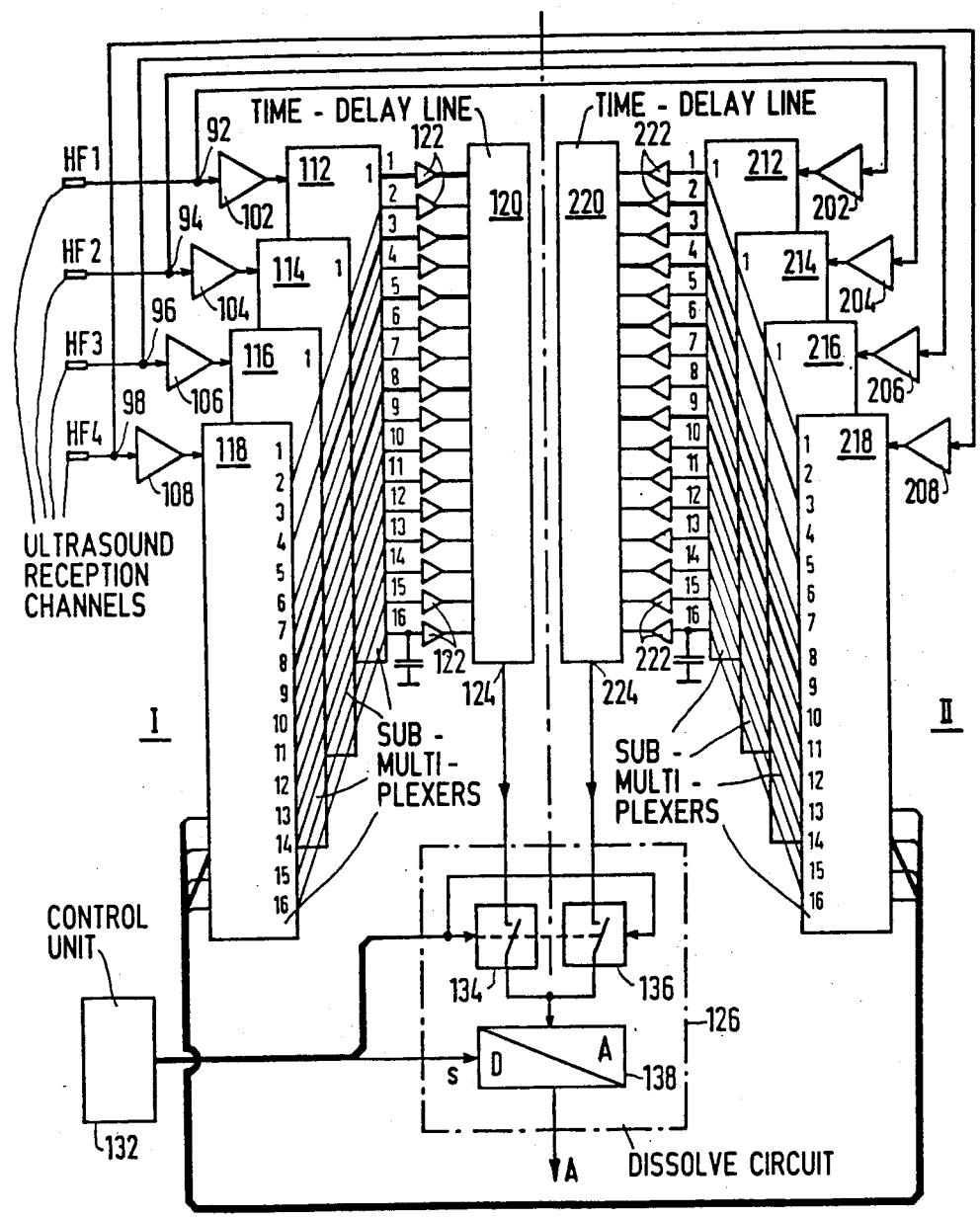
FIG. 8 is a further embodiment of the apparatus of FIG. 7 having a dissolve circuit for fast switching.
Figure 9:
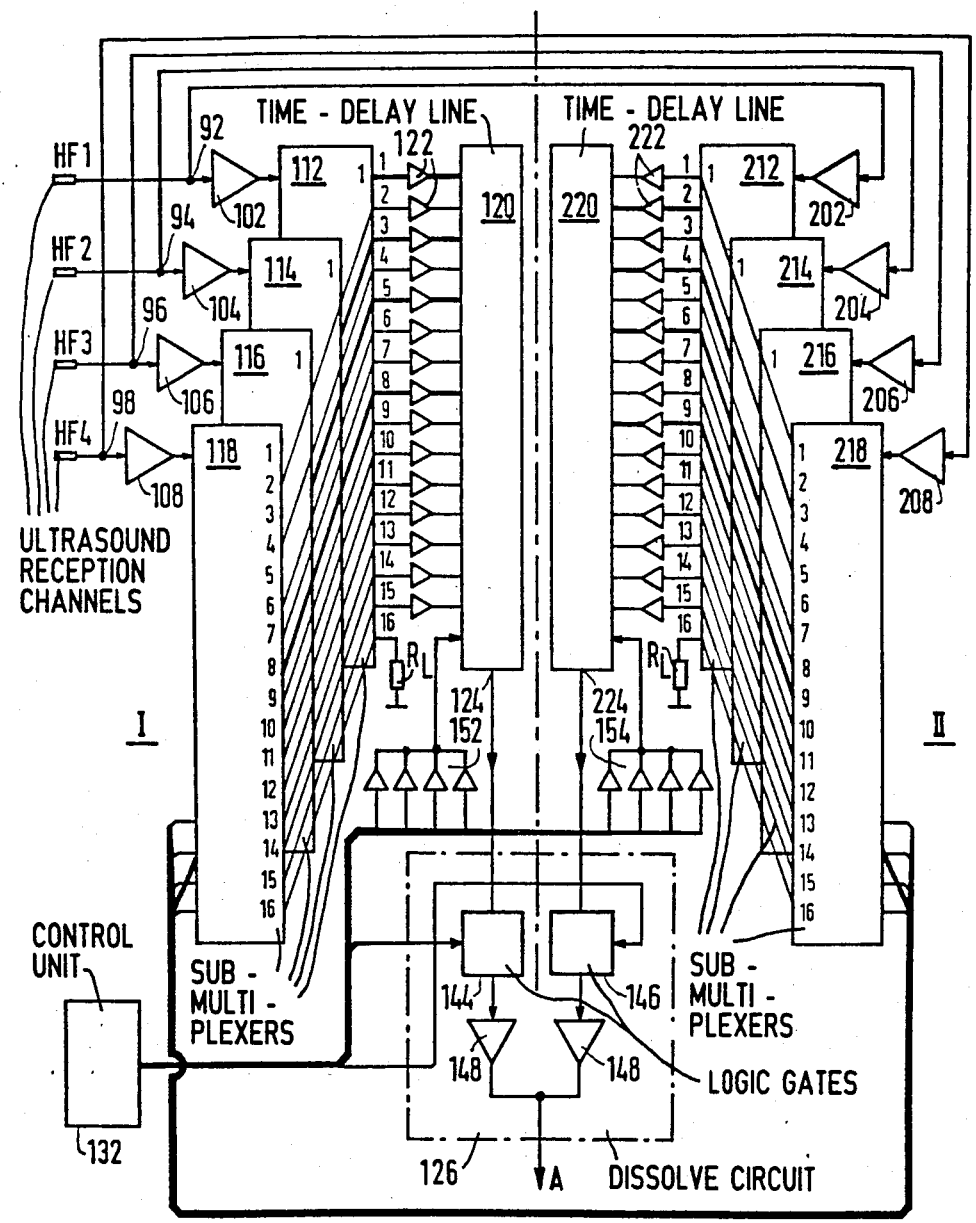
FIG. 9 is a further embodiment of the apparatus of FIG. 7 having a dissolve circuit with two attenuators controllable by switch-over functions.

In FIGS. 8 and 9, identical component parts are provided with the same reference characters as in FIG. 7. The subject matter of FIGS. 8 and 9 differs from that of FIG. 7, first, in the dissolve circuit 126 and in an embodiment of the circuit for aperture disconnection (aperture switching) of the ultrasound array.

The aperture disconnection is achieved in a simple way in that the ultrasound signal deriving from an ultrasound element which is not desired in the sginal processing is shorted in terms of RF preceding the time-delay line 120 or 220. To that end, the central control unit 132 places the output of the isolating amplifier 122 to RF ground.

It is merely shown in FIG. 8 that the input number 16 can be applied to RF ground.

In FIG. 8, the dissolve circuit 126 includes first and second fast switches 134 and 136 and a following analog-to-digital converter 138. The ultrasound sum signal of the first sub-circuit I is supplied to the first contact of the first fast switch 134. Correspondingly, the ultrasound sum signal of the second sub-circuit II is conducted to the first contact of the second fast switch 136. The second contact of both fast switches 134 and 136 are respectively connected to the input of the analog-to-digital converter 138. The two switches 134 and 136 work in opposite directions. This means that the central control unit 132 closes the first switch 134 when it opens the second switch 136 and vice versa. One of the two switches 134 or 136 is thus in its closed condition and the other is situated in its opened condition.

The fast switches 134 and 136 each has a control input which is connected to the central control unit 132. Likewise, the analog-to-digital converter 138 is connected to the central control unit 132.

The switches 134 and 136 are respectively switched by the control unit 132 exactly when the analog-to-digital converter 132 exhibits a blanking interval. The voltage peak appearing when switching is so short that it falls within the blanking interval of the analog-to-digital converter 138. The values of the ultrasound scanning before and after the switch-over of the switches 134 and 136 thus remain uninfluenced by the switching event. The respective ultrasound sum signal is thus present at the output A of the analog-to-digital converter 138 spike-free.

In FIG. 9, the dissolve circuit 126 includes gates 144 and 146 which may be attenuatable amplifiers with following summing amplifiers. The ultrasound sum signal of the first sub-circuit I is conducted to the first attenuatable amplifier 144; correspondingly, the ultrasound sum signal of the second subcircuit II is supplied to the second attenuatable amplifier 146. Both gates 144 and 146 can be oppositely blanked or faded in spike-free by the central control means 132 via special switch-over functions. The two following amplifiers 148 and 150 only accept the summation of both signals.

The aperture disconnection is achieved in the embodiment of FIG. 9 in that the output 16 of the analog multiplexers 112 and 212 is selected. The output 16 is connected to ground via a load resistor $R_L$. The value of the load resistor $R_L$ has the same order of magnitude as the value of the input resistor of the matching amplifiers 122 and 221. The isolating amplifiers 102 through 108 and 202 through 208 are always charged by the same load; a load alternation discontinuity thus does not occur. Further, matching amplifiers 152 and 154 via which no ultrasound information proceeds are cut in by the central control unit 132 given aperture disconnection. The matching amplifiers 152 and 154 stabilize the operating point of the remaining matching amplifiers 122 and 222 so that disturbances which arise due to sudden elimination of an RF-feed are thereby avoided.

Although modifications and changes may be suggested by those skilled in the art it is the intention of the inventors to embody within the patent warranted hereon all changes and modifications as reasonably and properly come within the scope of their contribution to the art.

We claim as our invention:

1. An ultrasound apparatus for generating an output signal for further processing, said apparatus comprising:
    a plurality of ultrasound transducer elements for respectively generating a like plurality of received ultrasound echo signals, each transducer element having an associated reception channel;
    means in each reception channel for time-delaying the ultrasound echo signal therein by a selected amount among a plurality of delays, said means consisting of two identical sub-circuits, each sub-circuit transmitting said ultrasound echo signal delayed by respectively different amounts;
    a dissolve circuit for generating said output signal for the outputs of said sub-circuits, said dissolve circuit including means for alternatingly fading the respective outputs of said subcircuits into said output signal by fading the output of a first of said sub-circuits into said output signal while simultaneously blanking a second of said sub-circuits and successively fading the output of said second of said sub-circuits into said output signal while blanking said first of said sub-circuits; and
    a control unit for said sub-circuits for respectively switching each of said sub-circuits to select a delay for each sub-circuit from among said plurality of delays, said control unit switching each of said sub-circuits only when that sub-circuit is blanked by said dissolve circuit for substantially eliminating disturbances in said output signal caused by switching said sub-circuits.

2. An ultrasound apparatus as claimed in claim 1, wherein the entirety of said time-delay means consists of said two identical sub-circuits, and a delay line connected to said sub-circuits.

3. An ultrasound apparatus as claimed in claim 1, wherein each sub-circuit comprises:
    a time-delay line having a plurality of output taps at which signals respectively delayed by different amounts are present; and
    a multiplexer having a plurality of inputs respectively connected to said taps of said delay line and an output connected to said dissolve circuit, said multiplexer being controlled by said control unit for through-connecting a selected one of said multiplexer inputs to said multiplexer output.

4. An ultrasound apparatus as claimed in claim 3, wherein each sub-circuit further comprises:
    an isolating amplifier disposed between said ultrasonic transducer element and said delay line.

5. An ultrasound apparatus as claimed in claim 1, wherein said time-delay means includes a delay line having a plurality of output taps at which respective signals delayed by different amounts are present, and wherein each sub-circuit comprises a multiplexer having a plurality of inputs respectively connected to said outputs of said delay line and an output connected to said dissolve circuit, each multiplexer being controlled by said control unit for selectively through-connecting one of said multiplexer inputs to said multiplexer output.

6. An ultrasound apparatus as claimed in claim 5, wherein each sub-circuit further comprises:
    a plurality of isolating amplifiers respectively connected between each delay line output and each multiplexer input.

7. An ultrasound apparatus as claimed in claim 1, wherein said dissolve circuit comprises:
    a first controllable gate connected to the output of said first of said sub-circuits;
    a second controllable gate connected to the output of said second of said sub-circuits; and
    a summing element having inputs respectively connected to the outputs of said first and second gates for adding said outputs of said first and second gates to generate said output signal.

8. An ultrasound apparatus as claimed in claim 7, wherein said dissolve circuit further comprises:
    two isolating amplifiers respectively disposed between the outputs of said controllable gates and the inputs of said summing element.

9. An ultrasound apparatus as claimed in claim 7, wherein said summing element is an amplifier.

10. An ultrasound apparatus as claimed in claim 7, wherein said first controllable gate comprises a first analog control element having an input to which said output of said first of said sub-circuits is supplied, an output connected to said summing element, and a control input, a first memory in which a first gate function defining the operation of said first controllable gate is stored, and a first digital-to-analog converter connected between said first memory and said control input of said first analog control element, said first analog control element controlling transmission therethrough of the output of said first of said sub-circuits to said summing element in accord with said first gate function, and wherein said second controllable gate comprises a second analog control element having an input connected to the output of said second of said sub-circuits, an output connected to said summing element, and a control input, a second memory having a second gate function defining the operation of said second controllable gate stored therein, and a second digital-to-analog converter connected between said second memory and said control input of said second analog control element said second analog control element controlling transmission therethrough of the output of said second of said sub-circuits to said summing element in accord with said second gate function.

11. An ultrasound apparatus as claimed in claim 10, wherein said first gate function is the complement said second gate function.

12. An ultrasound apparatus as claimed in claim 10, wherein said first gate function is sinusoidal.

13. An ultrasound apparatus as claimed in claim 7, wherein each of said first and second controllable gates includes a respective low-pass filter.

14. An ultrasound apparatus as claimed in claim 1, further comprising:
- a multiplexer having a plurality of inputs respectively connected to the outputs of the dissolve circuit for each reception channel and a like plurality of outputs ordered from a first output to a last output;
- a plurality of delay lines respectively connected to each of said multiplexer outputs accept said last multiplexer output;
- a plurality of summing elements connected to each of said multiplexer outputs except said first and last outputs, said summing elements respectively adding the signal from the multiplexer output associated therewith with a signal delayed by the delay line from an immediately preceding multiplexer output, and supplying the sum to the delay line for the output associated with said summing element; and
- a final summing element for adding the output of the delay line associated with the next-to-last multiplexer output with said last multiplexer output.

15. An ultrasound apparatus as claimed in claim 14, further comprising:
- a plurality of isolating amplifiers respectively disposed between each delay line and each summing element except said final summing element.

16. An ultrasound apparatus as claimed in claim 1, wherein each sub-circuit comprises:
- a time delay line having a plurality of inputs, each input having a different time delay associated therewith, and said time delay line summing all of the signals present at said inputs thereof and supplying said sum to said dissolve circuit; and
- means for selectively connecting at least one of said received ultrasound echo signals to said inputs of said time delay line.

17. An ultrasound apparatus as claimed in claim 16, wherein said means for selectively supplying said echo signals to said inputs of said delay line is a multiplexer.

18. An ultrasound apparatus as claimed in claim 17, wherein said multiplexer is a multi-stage multiplexer, each stage of said multi-stage multiplexer being associated with one reception channel.

19. An ultrasound apparatus as claimed in claim 18, wherein each sub-circuit further comprises:

- a plurality of isolating amplifiers respectively connected preceding each input of each stage of said multi-stage multiplexer; and
- a matching amplifier connected between each output of said multi-stage multiplexer and said inputs of said delay line.

20. An ultrasound apparatus as claimed in claim 1, wherein said dissolve circuit comprises:
- a first analog-to-digital converter having an input connected to said output of said first of said sub-circuits, an output, and a control input connected to said control unit;
- a second analog-to-digital converter having an input connected to said output of said second of said sub-circuits, an output, and a control input connected to said control unit; and
- a digital multiplexer having inputs respectively connected to the outputs of said first and second analog-to-digital converters and a control input connected to said control unit, said digital multiplexer selectively through-connecting said outputs of said first and second analog-to-digital converters to an output of said digital multiplexer for generating said output signal.

21. An ultrasound apparatus as claimed in claim 1, wehrein said dissolve circuit comprises:
- a first switch having an input connected to said output of said first of said sub-circuits, a control input connected to said control unit, and an output;
- a second switch having input connected to said output of said second of said sub-circuits, a control input connected to said control unit, and an output; and
- an analog-to-digital converter having an input connected to the outputs of said first and second switches and a control input connected to said control unit, and an output, said control unit generating a blanking interval for said analog-to-digital converter and oppositely operating said first and second switches during said blanking interval for generating said output signal at the output of said analog-to-digital converter.

22. An ultrasound apparatus having a plurality of reception channels, each reception channel comprising:
- an ultrasound transducer element for generating a received ultrasound echo signal;
- a delay line connected to said transducer, said delay line having a plurality of outputs, each output having a different time delay associated therewith;
- a first multiplexer having a plurality of inputs respectively connected to said outputs of said delay line, and having an output;
- a second multiplexer having a plurality of inputs respectively connected to the outputs of said delay line, and having an output;
- a control unit connected to said first and second multiplexers for respectively switching said multiplexers by selectively through-connecting one input of each multiplexer through to the respective output thereof, the selected through-connected inputs of said first and second multiplexers having ultrasound echo signals delayed by respectively different amounts; and
- a dissolve circuit for generating an output signal for said apparatus from the outputs of said first and second multiplexers, said dissolve circuit including means for alternatingly fading the output of said first multiplexer into said output signal while simultaneously blanking the output of the second multiplexer and successively blanking the output of said first multiplexer while fading the output of said second multiplexer into said output signal, said control unit switching each of said multiplexers only when that respective multiplexer is blanked by said dissolve circuit for substantially eliminating disturbances in said output signal caused by switching said multiplexers.

23. An ultrasound apparatus having a plurality of reception channels, each reception channel comprising:

an ultrasound transducer element for generating a received ultrasound echo signal;

a first delay line connected to said transducer having a plurality of outputs, each output having a different time delay associated therewith;

a first multiplexer having a plurality of inputs respectively connected to the outputs of said first delay line, and having an output;

a second delay line connected to said transducer having a plurality of outputs, said outputs each having a different time delay associated therewith;

a second multiplexer having a plurality of inputs respectively connected to said outputs of said second delay line, and having an output;

means for respectively switching said first and second multiplexers for selectively through-connecting one input thereof to the respective output thereof, the respective inputs through-connected in each multiplexer having different time delays; and a dissolve circuit for generating an output signal for said apparatus from the outputs of said multiplexers, said dissolve circuit including means for alternatingly fading the output of said first multiplexer into said output signal while simultaneously blanking the output of the second multiplexer and successively blanking the output of said first multiplexer while fading the output of said second multiplexer into said output signal, said means for switching each of said multiplexers only when that respective multiplexer is blanked by said dissolve circuit for substantially eliminating disturbances in said output signal caused by switching said multiplexers.

* * * * *